US008578155B2

United States Patent
Fukushima et al.

(10) Patent No.: US 8,578,155 B2
(45) Date of Patent: Nov. 5, 2013

(54) ADDRESS GENERATING METHOD AND BROADCAST RECEIVING APPARATUS

(75) Inventors: Masaru Fukushima, Kanagawa (JP); Shuichi Sugie, Tokyo (JP); Shinsaku Kiyomoto, Saitama (JP); Tatsuo Shibata, Tokyo (JP)

(73) Assignees: Kyocera Corporation, Kyoto (JP); KDDI Corporation, Tokyo (JP)

( * ) Notice: Subject to any disclaimer, the term of this patent is extended or adjusted under 35 U.S.C. 154(b) by 219 days.

(21) Appl. No.: 12/300,996

(22) PCT Filed: May 15, 2007

(86) PCT No.: PCT/JP2007/059971
§ 371 (c)(1),
(2), (4) Date: Jul. 6, 2009

(87) PCT Pub. No.: WO2007/132856
PCT Pub. Date: Nov. 22, 2007

(65) Prior Publication Data
US 2009/0316893 A1 Dec. 24, 2009

(30) Foreign Application Priority Data
May 16, 2006 (JP) .................................. 2006-136986

(51) Int. Cl.
*H04L 29/06* (2006.01)
*H04L 9/32* (2006.01)
*H04L 9/00* (2006.01)
*H04N 7/167* (2011.01)
*H04N 7/16* (2011.01)
*G06F 17/30* (2006.01)

(52) U.S. Cl.
USPC ........... 713/162; 713/165; 713/168; 713/171; 380/201; 380/210; 380/223; 380/241; 380/44; 726/2; 726/26; 725/31

(58) Field of Classification Search
USPC ............ 380/210, 201, 223, 241, 44; 713/162, 713/165, 168, 171; 726/2, 26; 725/31
See application file for complete search history.

(56) References Cited

U.S. PATENT DOCUMENTS 5,818,935 A * 10/1998 Maa .............................. 380/200
6,807,277 B1 * 10/2004 Doonan et al. ................ 380/281
(Continued)

FOREIGN PATENT DOCUMENTS

| JP | 2004-015375 | 1/2004 |
| JP | 2006-042244 | 2/2006 |

OTHER PUBLICATIONS

Japanese language office action dated May 10, 2011 and its English language translation for corresponding Japanese application 2006136986.

(Continued)

*Primary Examiner* — Aravind Moorthy
(74) *Attorney, Agent, or Firm* — DLA Piper LLP (US)

(57) ABSTRACT

A broadcast receiving apparatus comprises a broadcast receiving unit (1, 4~13) for receiving a digital broadcast; a communication unit (1~3) for performing two-way communication through a network; an operation unit 15 for performing an acquisition operation of a key for decrypting an encrypted broadcast program received by the broadcast receiving unit; and an address generating unit 16 for generating an address of an acquisition location of the key which is accessible with the communication unit, by using program arrangement information corresponding to the broadcast program based on the acquisition operation of a key by the operation unit.

13 Claims, 3 Drawing Sheets

(56) References Cited

U.S. PATENT DOCUMENTS

| | | | |
|---|---|---|---|
| 7,225,162 B2 * | 5/2007 | Kim et al. | 705/51 |
| 2004/0187027 A1 * | 9/2004 | Chan | 713/201 |
| 2005/0005128 A1 * | 1/2005 | Lambert et al. | 713/182 |
| 2005/0111663 A1 * | 5/2005 | Lotspiech et al. | 380/239 |
| 2006/0184807 A1 * | 8/2006 | Kocher et al. | 713/194 |
| 2007/0055869 A1 * | 3/2007 | Peng et al. | 713/162 |
| 2007/0110012 A1 * | 5/2007 | Abu-Amara | 370/338 |

OTHER PUBLICATIONS

Japanese language office action dated Aug. 2, 2011 and its English language translation for corresponding Japanese application 2006136986.

Chinese language office action dated Sep. 13, 2012 and its English language translation issued in corresponding Chinese application 200780017810.6.

\* cited by examiner

ADDRESS GENERATING METHOD AND BROADCAST RECEIVING APPARATUS

CROSS REFERENCE TO RELATED APPLICATION

This application is a national stage of International Application No. PCT/JP2007/059971 filed on May 15, 2007, and claims the benefit of priority under 35 USC 119 of Japanese Patent Application No. 2006-136986 filed on May 16, 2006 which are incorporated herein by reference.

FIELD OF THE INVENTION

The present invention relates to an address generating method of an acquisition location on a network which provides a key for decrypting an encrypted broadcast program broadcasted in digital broadcasting and a broadcast receiving apparatus.

DESCRIPTION OF THE RELATED ART

Recently, as digital broadcasting put to practical use, various kinds of apparatus with digital broadcast receivers have been suggested (see Japanese Patent Application Laid-open No. 2006-42244).

Moreover, it has been considered as an operation of a digital broadcasting system that a broadcast station broadcasts programs by encrypting them on the program basis and a user acquires a key for decrypting a desired program from a predetermined web page On the Internet which provides the key corresponding to the broadcast program, by paying for (Pay Per View: PPV type) or without pay, and then watches the encrypted broadcast program.

In addition, as an encryption method of broadcast program data in the digital broadcasting for a mobile terminal, considering performance of the mobile terminal, a stream encryption method which has lower processing load is more desirable than a block encryption method generally used for transmitting contents over the Internet or the like.

DISCLOSURE OF THE INVENTION

Problems to be Solved by the Invention

Under the conventional system, in order to access a web page of a desired broadcast program via the Internet, for example, a user needs to access a web site (homepage) of a content provider, and then move to a page of the desired broadcast program through a page having a program table, or directly access the page having the program table of the content provider and then move to the page of the desired broadcast program. Thus, a number of transitional operations are needed.

As described above, when a user acquires a key for decrypting an encrypted broadcast program by accessing a predetermined web page on the Internet that is a key acquisition location corresponding to the broadcast program, a number of transitional operations are needed. Therefore, it takes time to acquire the key, which may lead to an increase of communication cost. Moreover, when a user watches an encrypted program in real-time, and if there is no enough time before a broadcast program is started, the user cannot acquire a key before the program is started. In this case, the user cannot watch the desired broadcast program from the first part.

In the view of the above problem, an object of the present invention is to provide an address generation method which allows a user to directly access an acquisition location on a network which provides a key for decrypting an encrypted broadcast program which is broadcasted in digital broadcasting; and which increases possibility that a user can watch the program from the first part even if there is no enough time comparatively before the desired program is started, as well as reduces communication cost, and a broadcast receiving apparatus employing the method.

Means for Solving the Problem

To achieve the above object, the invention of the stream generation method according to claim 1, generates, in order to acquire a key for decrypting an encrypted broadcast program broadcasted in digital broadcasting, an address of an acquisition location on a network which provides a key for decrypting the broadcast program by using program arrangement information corresponding to the broadcast program.

The invention of the broadcast receiving apparatus according to claim 2, comprises a broadcast receiving unit for receiving a digital broadcast signal; a communication unit for performing two-way communication through a network; an operation unit for performing an acquisition operation of a key for decrypting an encrypted broadcast program received by the broadcast receiving unit; and an address generating unit for generating an address of an acquisition location of the key which is accessible with the communication unit, by using program arrangement information corresponding to the broadcast program based on the acquisition operation of the key by the operation unit.

The invention according to claim 3 is characterized in that in the broadcast receiving apparatus of claim 2, the address generating unit generates the address by using at least one of a network ID, a transport stream ID, a service ID and an event ID included in the program arrangement information.

Effect of the Invention

According to the present invention, since an address of an acquisition location on a network that provides a key for decryption of a broadcast program is generated by using program arrangement information corresponding to the broadcast program, a user can access the acquisition location directly. Therefore, when a user watches a desired broadcast program in real time, it is possible to increase probability that a user can watch the program from the first part even if there is no enough time comparatively before the program is started, as well as to reduce communication cost.

REFERENCE SYMBOLS

Figure 1:
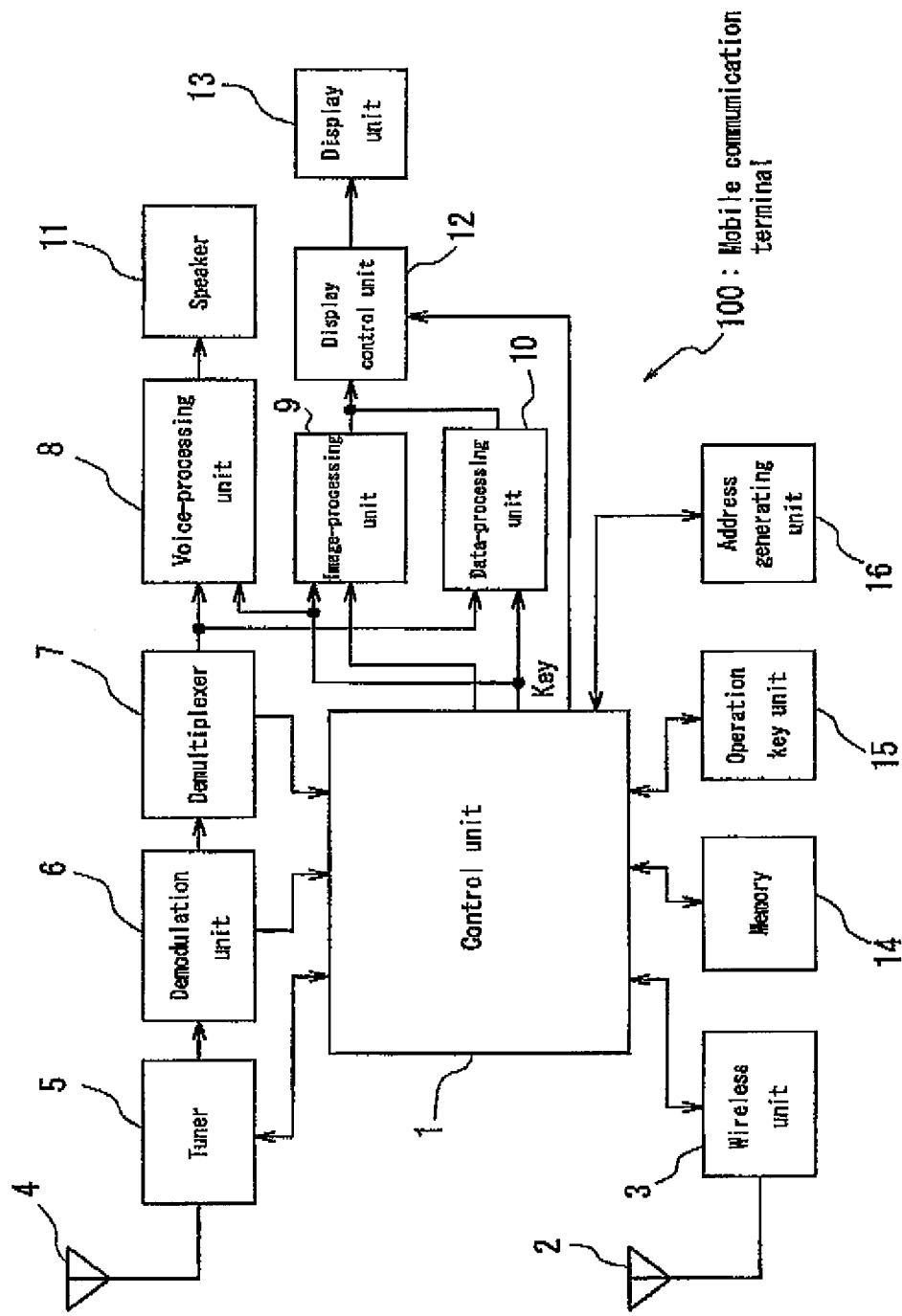
FIG. 1 is a block diagram illustrating a circuit configuration of a main part of a broadcast receiving apparatus according to an embodiment of the present invention.

100 a mobile communication terminal
1 a control unit 2 an antenna
3 a wireless unit
4 an antenna
5 a tuner
6 a demodulation unit
7 a demultiplexer
8 a voice-processing unit
9 an image-processing unit
10 a date-processing unit
11 a speaker
12 a display control unit
13 a display unit
14 a memory
15 an operation key unit
16 an address generating unit
21 a key mark
25 a pop-up screen

BEST MODE FOR CARRYING OUT THE INVENTION

Preferred embodiments of the present invention will now be described with reference to the accompanying drawings.

FIG. 1 is a block diagram illustrating a circuit configuration of a main part of a broadcast receiving apparatus according to an embodiment of the present invention.

The broadcast receiving apparatus may be a mobile communication terminal which is, for example, a cell phone capable of network-communication through the Internet and having a TV reception function for watching terrestrial digital TV broadcasting, namely, one segment broadcasting. The broadcast receiving apparatus has: a control unit 1 which controls the entire system; an antenna 2 and a wireless unit 3 for a communication, which compose a communication unit; an antenna 4 and a tuner 5 for receiving broadcast signals, which compose a broadcast receiving unit.

The wireless unit 3 are designed to modulate voice information, email and the like which are processed by the control unit 1, and transmit them by radio from the transmission/reception antenna 2 to a broadcast station not shown. Moreover, the wireless unit 3 are designed to demodulate various kinds of information transmitted from a broadcast station by radio such as voice information, email, and the like which are received with the transmission/reception antenna 2, and then transmit them to the control unit 1.

On the other hand, broadcast signals received with the antenna 4 are tuned by the tuner 5 under the control of the control unit 1. From the tuned broadcast signals, transport stream (TS) packets are extracted by the demodulation unit 6 and provided to a demultiplexer 7. The demultiplexer 7 demultiplexes the packets to a voice-processing unit 8, an image-processing unit 9, and a data-processing unit 10 according to packet IDs.

The voice-processing unit 8, the image-processing unit 9, and the data-processing unit 10 are respectively provided with a key from the control unit 1 for decrypting a broadcast program currently being modulated at the modulation unit 6 and, for example, encrypted by stream-encryption method, and perform decoding processes respectively using the key. Voice information decoded by the voice-processing unit 8 is outputted from a speaker 11; and image information and data information decoded by the image-processing unit 9 and the data-processing unit 10, respectively, are displayed on a display unit 13 through a display control unit 12.

The mobile communication terminal according to this embodiment has a memory 14 for storing various kinds of data, an operation key unit 15 for operating the mobile communication terminal and performing an acquisition operation of a key for decrypting an encrypted broadcast program, and an address generating unit 16 for generating an address of an acquisition location on the Internet based on the key acquisition operation of the operation key unit 15.

In this embodiment, an electronic program guide (EPG) for terrestrial digital TV broadcasting is stored in the memory 14 with being updated. The electronic program guide may be acquired from program arrangement information (SI) received by the broadcast receiving unit, and stored in the memory 14. It may be also downloaded to the memory 14 by accessing a web site of a desired content provider on the Internet with the communication unit.

The electronic program guide is made based on the program arrangement information, and the program arrangement information includes a network ID(NID) for identifying content provider, a transport stream ID(TID) for identifying a broadcast channel, a service ID(SID) for identifying a provided segment of a broadcast program in the broadcast channel, and an event ID(EID) for identifying a broadcast program.

The memory 14 stores decryption keys to be corresponded to respective encrypted broadcast programs. When a broadcast program is received, a corresponding key is provided to the voice-processing unit 8, the image-processing unit 9 and the data-processing unit 10 from the control unit 1, as described above.

Figure 2:
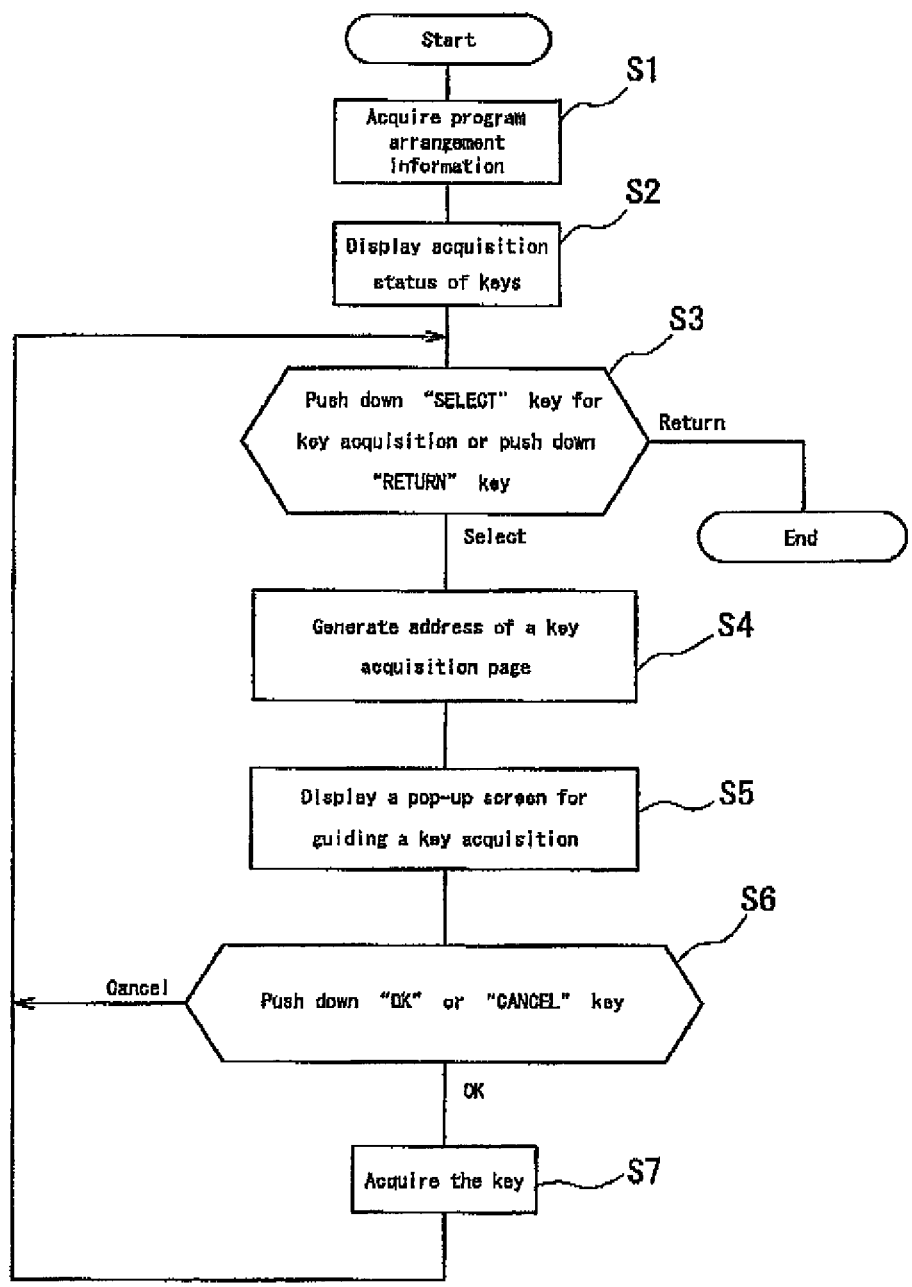
FIG. 2 is a flow chart illustrating a key acquisition operation of the broadcast receiving apparatus shown in FIG. 1.
Figure 3:
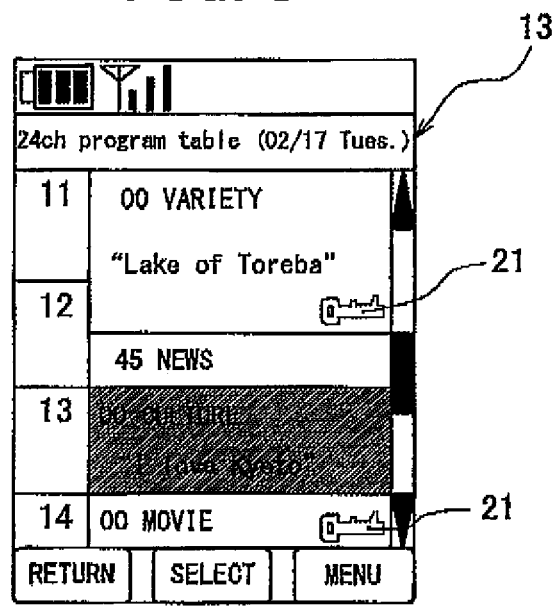
FIG. 3 exemplifies display of an electronic program guide.

Next, the acquisition operation of a decryption key according to this embodiment will be described by referring to a flow chart shown in FIG. 2, and exemplary displays on the display unit 13 shown in FIGS. 3 and 4.

The mobile communication terminal 100 according to this embodiment acquires program arrangement information with the broadcast receiving unit or the communication unit, and stores the information in the memory 14 (step S1). And then, the mobile communication terminal 100 displays acquisition status of keys on the display unit 13 (step S2) according to user's operations with the operation key unit 15. At step S2, for example, as shown in FIG. 3, the mobile communication terminal 100 displays an electronic program guide on the display unit 13, and also displays, for a broadcast program whose decryption key has been already acquired, a key mark 21 indicating that the key has been acquired on a display region of the broadcast program.

Next, when a program whose key has not been acquired is focused in programs displayed on the display unit 13, the mobile communication terminal 100 determines whether a "SELECT" key is pushed down or a "RETURN" key is pushed down by a user operation to the operation key unit 15 (step S3). FIG. 3 shows the display when a program of "I love Kyoto" of the 24th channel is focused.

In here, when a program whose key has not been acquired is focused and the "SELECT" key is pushed down, the mobile communication terminal 100 controls the address generating unit 16 to generate an address of a key acquisition page on the Internet (step S14) using electronic arrangement information corresponding to the broadcast program and stored in the memory 14. Moreover, as shown in FIG. 4, the mobile communication terminal 100 may display a pop-up screen 25 that guides a key acquisition process for the selected broadcast program (step S5), and displays an address generated by the address generating unit 16 on the pop-up screen 25. FIG. 4 shows, for example, "HTTP://www.00TV-jp/bangumi/0525" generated and displayed by using information (for example, 00TV.jp/bangumi/) corresponding to NID of the 24th channel and EID (for example, 0525) of the "I love Kyoto", as the address of a key acquisition page.

Component information essential for generating URL such as "HTTP://" is previously stored in the memory 14. The memory 14, namely, stores "HTTP://" or "HTTP://www", and "00TV.jp", "00TV.jp/bangumi" and the like of each content provider as the component information. The address generation unit 16 generates an address of a key acquisition page by combining the component information (i.e. HTTP://, etc.) and a portion (i.e. NID, etc.) of the electronic arrangement information corresponding to a broadcast program stored in the memory 14. For example, when the address is generated by combining component information and NID and EID in the electronic arrangement information, and if component information is "HTTP://"; component information previously stored corresponding to a content provider (i.e. NID, etc.) of a broadcast program for which a user want to acquire a key is "00TV.jp"; and EID is "0525", the address of "HTTP://00TV.jp/0525" is generated.

Figure 4:
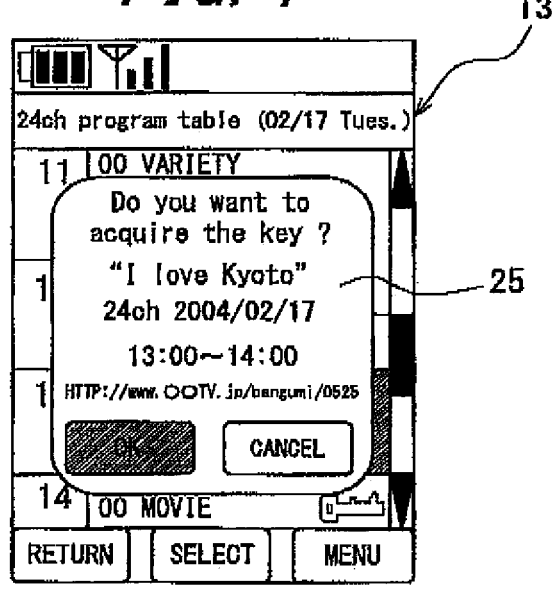
FIG. 4 exemplifies display of a pop-up screen for guiding key acquisition.

Next, the mobile communication terminal 100 detects whether a user pushes down a soft key of "OK" or "CANCEL" displayed on the pop-up screen 25 in FIG. 4 (step S6). If the soft key of "OK" is pushed down, the mobile communication terminal 100 connects to the Internet from me control unit 1 and through the wireless unit 3 and the antenna 2, directly accesses a key acquisition page by referring to the address generated by the address generation unit 16, and acquires (downloads) the key (step S7). The downloaded key is stored in the memory 14 to be corresponded to the broadcast program.

At step S7, when the key acquisition operation is completed for the desired broadcast program, the process flow returns to step S3 so that a user can select another program whose key has not been acquired. Similarly, at step S6, if the soft key of "CANCEL" is pushed down, the process flow proceeds to step S3 so that a user can select another program whose key has not been acquired.

On the other hand, if the "RETURN" key is pushed down without selecting a program whose key has not been acquired at step S3, the mobile communication terminal 100 ends the acquisition operation for a decryption key.

As described above, the mobile communication terminal 100 according to this embodiment generates an address of a key acquisition page which provides a decryption key for the desired broadcast program on the network, using a program arrangement information corresponding to the broadcast program, so that a user can directly access to a key acquisition page without doing transitional operations of web pages. Therefore, it is possible to reduce communication cost. Moreover, when a user watches a desired broadcast program in real-time, it is possible to increase probability that the user can watch the broadcast program from the first part even if there is no enough time comparatively before a broadcast program is started.

The invention has been described in detail with particular reference to certain preferred embodiments thereof, but it will be understood that variations and modifications can be effected within the spirit and scope of the invention. For example, in FIG. 2, the key access operation may be ended when the key is acquired at step S7 without proceeding to step S3. In addition, when the "SELECT" key is pushed down at step S3 of FIG. 2, it is possible to acquire a key by directly accessing a key acquisition page using the address generated by the address generation unit 16 and inquiring whether key acquisition is necessary or not on the key acquisition page without displaying the pop-up screen 25 shown in FIG. 4

Moreover, the address of a key acquisition page may be generated, for example, as "HTTP://www.NID/TID/SID/EID" by using 4 IDs of NID, TID, SID and EID included in the electronic arrangement information according to a web site of content provider, or may be generated by using one or more ID(s) needed.

The present invention is applicable to a mobile communication terminal with a TV reception function of terrestrial digital TV broadcasting such as PDA, as well as a cell phone with a TV reception function of terrestrial digital TV. It is also applicable to a broadcast receiving apparatus of a stationary type that receives terrestrial digital TV broadcasting, as well as the mobile communication terminal. Moreover, the present invention is applicable to decryption of an encoded broadcast program in satellite digital TV broadcasting and terrestrial/satellite digital audio broadcasting, as well as in terrestrial digital TV broadcasting. Furthermore, the present invention is not limited to a broadcast program encoded by a stream encryption method, and it is possible to apply the present invention to reception of a broadcast program encrypted by a block encryption method. The present invention is also applicable when an encoded broadcast program is stored in a recording medium or the like without being decrypted, and played by acquiring a decryption key afterward.

The invention claimed is:

1. An address generating method to acquire a key for decrypting an encrypted broadcast program broadcasted in digital broadcasting by a broadcast transmitting apparatus, comprising:
   receiving by a broadcast receiving apparatus a plurality of program arrangement information corresponding to the broadcast program;
   generating by the broadcast receiving apparatus a web page address of a key acquisition location on a network that provides a key for decrypting the broadcast program by combining the plurality of received program arrangement information consecutively together as one web page address.

2. A broadcast receiving apparatus comprising:
   a hardware broadcast receiving unit including a tuner and memory receiving a digital broadcast signal and receiving a plurality of program arrangement information corresponding to an encrypted broadcast program;
   a hardware communication unit including an antenna performing two-way communication through a network;
   a hardware operation key unit including a user input key pushed by a user to perform an acquisition operation of a key for decrypting the encrypted broadcast program received by the broadcast receiving unit; and
   a hardware address generating unit including memory generating a web page address of an acquisition location of the key which is accessible with the communication unit, the web page address generated by combining the plurality of received program arrangement information consecutively together as one web page address based on the acquisition operation of the key by the operation key unit.

3. The broadcast receiving apparatus of claim 2, wherein the broadcast receiving unit or the communication unit receives program arrangement information corresponding to the broadcast program, and
   the address generating unit generates the address based on the program arrangement information.

4. The broadcast receiving apparatus of claim 3, comprising:
   a memory storing component information essential for generating the address,
   wherein the address generating unit generates the address by combining the component information and a portion of the program arrangement information.

5. The broadcast receiving apparatus of claim 3, wherein the program arrangement information is an information basing an electronic program guide.

6. The broadcast receiving apparatus of claim 5, comprising:
a display displaying the electronic program guide,
wherein the address generating unit generates the address, when the operation key unit accepts an operation for selecting a program included in the electronic program guide displayed on the display, based on the program arrangement information corresponding to the selected program.

7. The broadcast receiving apparatus of claim 6, wherein the display unit displays the address generated by the address generating unit.

8. The broadcast receiving apparatus of claim 7, wherein the communication unit accesses the address and acquires the key for decrypting the broadcast program in a location on a network corresponding to the address when the address displayed on the display is selected by the operation accepted by the operation key unit.

9. The broadcast receiving apparatus of claim 8, wherein the display displays a key mark indicating that the key has been acquired on a display region where the program included in the electronic program guide is displayed when the communication unit acquires the key for decrypting the program.

10. The broadcast receiving apparatus of claim 8, further comprising:
a memory storing information, wherein
the memory stores the key acquired by the communication unit and the program arrangement information received by the communication unit, and
the key and the program arrangement information are corresponded in the memory.

11. The broadcast receiving apparatus of claim 3, wherein the address generating unit generates the address by using at least one of a network ID, a transport stream ID, a service ID and an event ID included in the program arrangement information.

12. The broadcast receiving apparatus of claim 2, wherein the communication unit accesses the address and acquires the key for decrypting the broadcast program in a location on a network corresponding to the address.

13. An address generating method to acquire a key for decrypting an encrypted broadcast program broadcasted in digital broadcasting by a broadcast transmitting apparatus, comprising:
generating by a broadcast receiving apparatus a web page address of a key acquisition location on a network which provides a key for decrypting the broadcast program based on combination of a plurality of program arrangement information lacking a web page address consecutively together as one web page address.

* * * * *